（12）United States Patent
Low et al.

(10) Patent No.: US 7,446,519 B2
(45) Date of Patent: Nov. 4, 2008

(54) PWM/BURST MODE SWITCHING REGULATOR WITH AUTOMATIC MODE CHANGE

(75) Inventors: Khim Leng Low, Singapore (SG);
David Seng Poh Ho, Singapore (SG);
Chi-Ming Hsiao, Hsin-Chi (TW); Hua Beng Chan, Singapore (SG)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/494,634

(22) Filed: Jul. 28, 2006

(65) Prior Publication Data

US 2007/0040537 A1 Feb. 22, 2007

Related U.S. Application Data

(60) Provisional application No. 60/709,427, filed on Aug. 19, 2005.

(51) Int. Cl.
*G05F 1/575* (2006.01)
*G05F 1/618* (2006.01)

(52) U.S. Cl. ..................... 323/285; 323/284

(58) Field of Classification Search .............. 323/224, 323/282, 284, 285, 222, 223, 265, 268, 271, 323/350, 351
See application file for complete search history.

(56) References Cited

U.S. PATENT DOCUMENTS 5,481,178 A * 1/1996 Wilcox et al. .............. 323/287

| | | | | |
|---|---|---|---|---|
| 6,671,143 B2 * | 12/2003 | Hwang | ................... | 361/18 |
| 6,828,766 B2 * | 12/2004 | Corva et al. | ............... | 323/284 |
| 7,026,800 B2 * | 4/2006 | Liu et al. | ................. | 323/270 |
| 7,245,113 B2 * | 7/2007 | Chen et al. | ................. | 323/271 |

OTHER PUBLICATIONS

Pressman, Abraham I., "Feedback-Loop Stabilization", Switching Power Supply Design, McGraw-Hill Inc., Second Edition, Section 12.9-12.14, 1998, pp. 448-458.
Rais Miftakhutdinov, An Analytical Comparison of Alternative Control Techniques for Powering Next-Generation Microprocessors, TI-Unitrode Power Supply Design Seminar, 2001, pp. 1-1-1-39 (http://focus.ti.com/lit/ml/slup168/slup168.pdf).

* cited by examiner

*Primary Examiner*—Gary L Laxton
(74) *Attorney, Agent, or Firm*—Sterne, Kessler, Goldstein & Fox P.L.L.C.

(57) ABSTRACT

A switching regulator automatically operates in pulse width modulation ("PWM") mode for high load currents and in burst mode for low load currents. The switching regulator includes a pair of switches to provide a regulated current to a load. The switching regulator further includes a multi-input comparator. A first input of the comparator is coupled to an output of the pair of switches. A second input of the comparator is coupled to a filtered version of the output and a third input is coupled to a reference waveform. The first, second and third inputs of the comparator form a combined input signal to the comparator. An output signal of the comparator is generated by comparing the combined input signal to a threshold of the comparator. The output signal determines a switching frequency of the pair of switches such that the switching frequency is automatically reduced when the load is decreased.

9 Claims, 9 Drawing Sheets

CONVENTIONAL ART

FIG. 1

CONVENTIONAL ART

FIG. 2A

CONVENTIONAL ART

FIG. 2B

CONVENTIONAL ART

PWM/BURST MODE SWITCHING REGULATOR WITH AUTOMATIC MODE CHANGE

CROSS REFERENCE TO RELATED APPLICATIONS

The present application claims the benefit of U.S. Provisional Application No. 60/709,427, filed Aug. 19, 2005, which is hereby incorporated by reference in its entirety.

BACKGROUND OF THE INVENTION

1. Field of the Invention

The present invention generally relates to the regulation of supply voltages by switching regulators. More specifically, the present invention provides a pulse width modulation and burst modes switching regulator having automatic mode change.

2. Background Art

Switching regulators are used to regulate supply voltages for powering circuits. Specifically, supply voltages are regulated down or regulated up to appropriate voltage levels by a switching regulator.

Switching regulators can be broadly classified into fixed and non-fixed switching frequency types. Pulse width modulation ("PWM") is typically used in the control loop for fixed frequency switchers. A high switching frequency is typically used to ensure low output ripple voltage. PWM switchers can achieve high power efficiency for moderate to high load currents. For low load currents, however, PWM switchers have low power efficiency due to the losses from high frequency switching. In the case of low load currents, a second class of non-PWM switchers, such as burst-mode (gated-oscillator) and pulse-frequency modulation ("PFM") switchers, are used. The burst-mode switcher uses an oscillator of fixed-frequency and fixed duty-cycle clock which is gated by the feedback control loop to produce a lower average burst frequency at light loads. The PFM switcher uses a variable frequency clock that has either fixed ON-time or fixed OFF-time to control the switches. The second class of switchers is able to switch at a lower average frequency for low load currents. This enables it to have higher power efficiency for low load currents compared to PWM switchers.

A third class of switchers is the hysteretic self-oscillating type of switcher. The hysteretic self-oscillating switcher is basically an oscillator which generates its own switching frequency to control the ripples at its output. The hysteretic self-oscillating switcher has the advantage of being efficient to a larger load range, but suffers from poor switching frequency variation caused by external/internal component tolerances. Hysteretic self-oscillating switchers have a faster transient response compared to PWM switchers.

Many switching regulators often employ a combination of the first two classes of switchers mentioned above to cover the full load range. Accordingly, many switching regulators need to alternate between two different regulation loops or architectures to toggle between the PWM and non-PWM modes. Often, switching between modes must be made manually or physically. Depending on load current conditions, an external controller can choose the mode that will give higher power efficiency. However, for many applications, such as digital communications, it is not always possible to anticipate the load current condition and make mode changes for higher power efficiency. As a result, many such dual-mode switching regulators with separate PWM and non-PWM regulation loops are inefficient. What is needed is a switching regulator that can automatically toggle between PWM and non-PWM modes within the same regulation loop or architecture.

BRIEF SUMMARY OF THE INVENTION

Accordingly, a switching regulator is provided that is able to achieve a fast response similar to a hysteretic self-oscillating switcher and at the same time able to precisely control its switching frequency similar to a PWM switcher. An added advantage that comes from the higher bandwidth is that lower output impedance for higher frequencies can be achieved, thus allowing smaller load capacitors to be used compared to conventional PWM switchers.

Automatic mode change of the switching regulator is also provided for improved efficiency while maintaining the same PWM regulation loop. Automatic transition from PWM to burst mode occurs based on load current condition without the need for any manual architecture change or external controller. When it is in burst mode, the behavior resembles the gated-oscillator topology.

Further, a user can manually switch to a super-low-power mode (e.g., Low-Power Operating Mode or "LPOM") according to an embodiment of the present invention.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

Figure 1:
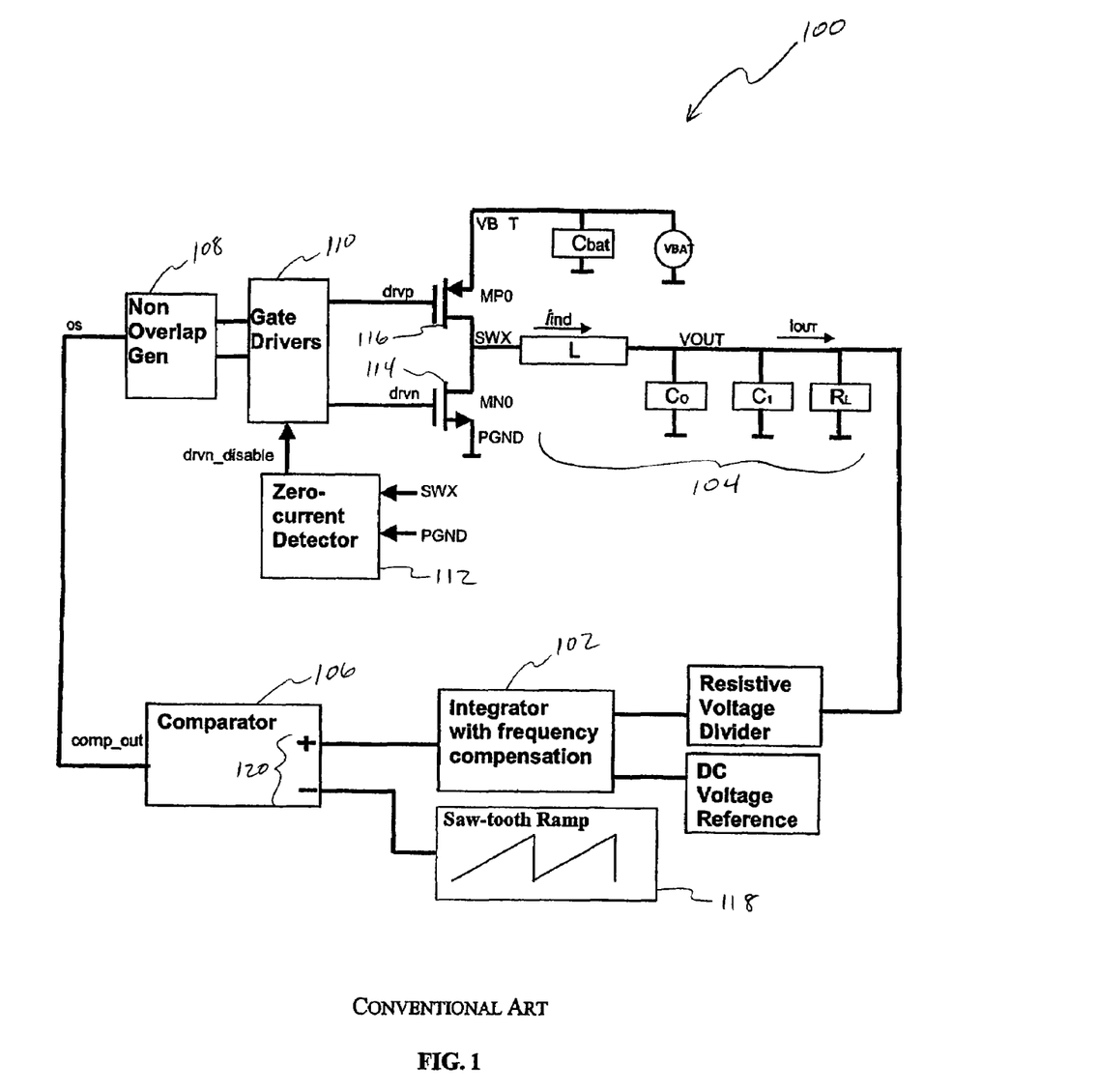
FIG. 1 illustrates a conventional pulse width modulation ("PWM") type switcher.

FIG. 1 illustrates a conventional pulse width modulation ("PWM") type switcher 100. PWM switcher 100 includes an integrator 102, LC filter 104, single-input comparator 106, non-overlap generator 108, gate drivers 110, zero current detector 112, NMOS switch 114, and PMOS switch 116. NMOS switch 114 and PMOS switch 116 output a feedforward signal SWX to integrator 102 and zero current detector 112. Integrator 102 is in a feedback loop to provide a large low frequency gain for the feedback loop. Comparator 106 receives the output of integrator 102 and a saw-tooth reference ramp voltage 118 as differential input 120.

A side effect of having integrator 102 in the feedback loop followed by comparator 106 is that it slows down the loop response. This is because a change in output voltage VOUT caused by a sudden change in load current $I_{OUT}$ is significantly attenuated by integrator 102. This limits the range of instantaneous duty cycle adjustment that can be made by comparator 106 and hence slows down the speed of PWM switcher 100 in reacting and correcting a large load current change. This makes PWM switcher 100 not suitable for digital or microprocessor type loads, which often have fast, large load current transients.

In PWM switcher 100, a phase response from integrator 102 coupled with a 180° phase shift from LC filter 104 makes the feedback loop difficult to compensate in the frequency domain. Switcher frequency compensation often involves the use of active and passive networks to generate frequency zeroes to provide adequate phase lead to compensate the excessive phase lag introduced by LC filter 104 and integrator 102.

Traditionally, such zeroes are created both externally as well as on-chip. An external zero is traditionally created through the use of leaded capacitors or special chip capacitors with well-controlled equivalent series resistance ("ESR"). This dependency of switchers on external passive components creates an extra burden on an end user to ensure the proper operation of the switchers. An on-chip zero is conventionally created using active and passive networks consisting of op-amps, resistors and capacitors. The capacitors used are often floating capacitors where both terminals are connected in series along the signal path. To realize these floating capacitors in a standard complementary metal oxide semiconductor ("CMOS") process, the silicon area is significant. This increases the die cost.

Figure 3:
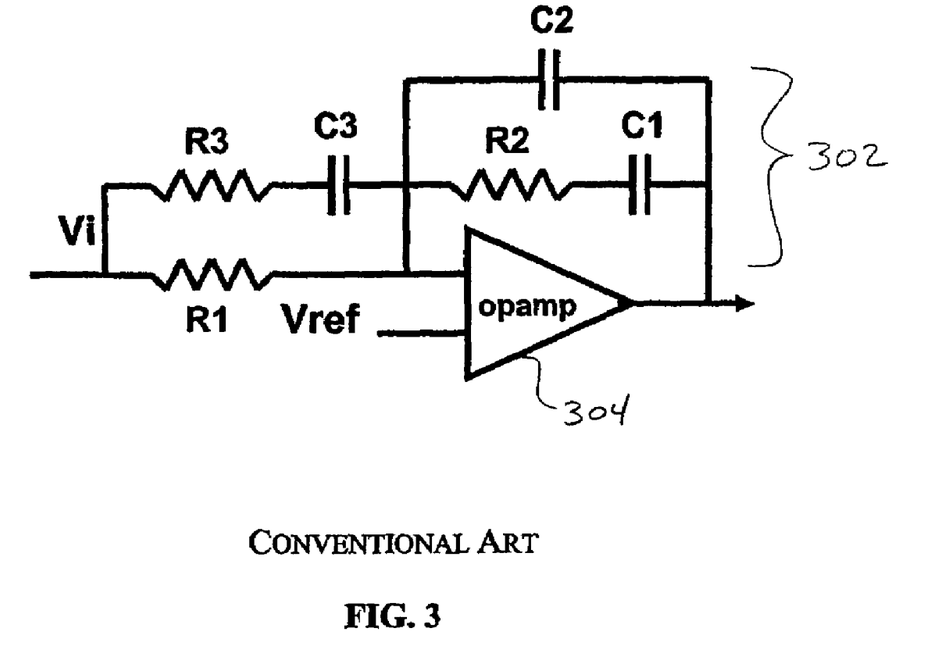
FIG. 3 illustrates a conventional active frequency compensation network.

FIG. 3 illustrates a conventional on-chip active frequency compensation network that may be used in integrator 102. An input voltage $V_i$ interacts with an RC network 302 prior to being input into opamp 304. A reference voltage $V_{ref}$ is input as a second input into opamp 304. Because of RC network 302, the output of opamp 304 includes two zeroes to provide an adequate phase margin for stability in the PWM switcher.

Figure 2A:
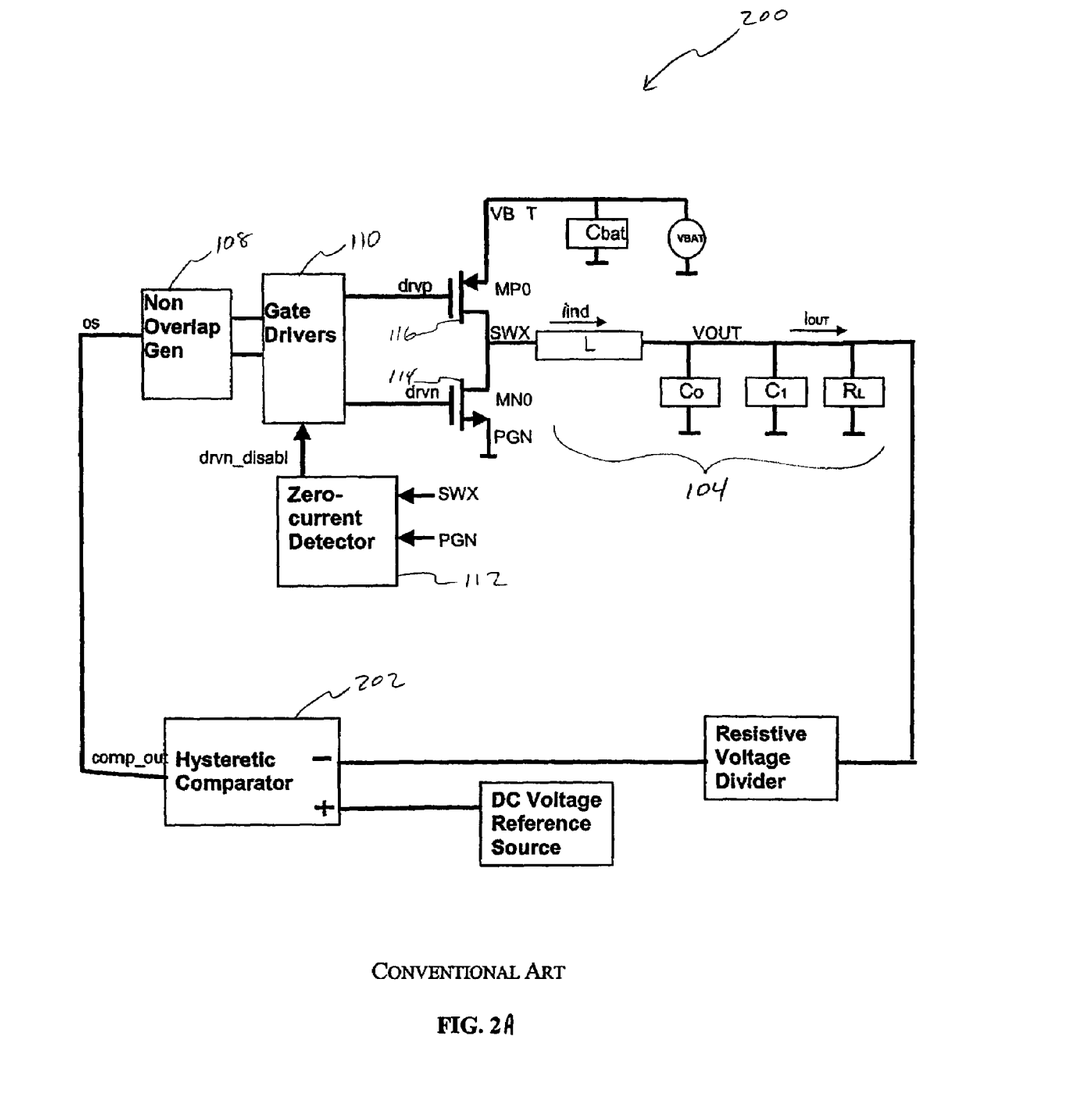
FIG. 2A illustrates a conventional hysteretic type switcher.

FIG. 2A illustrates a conventional hysteretic type switcher 200. Unlike PWM switcher 100, hysteretic switcher 200 does not include an integrator. Instead, an output voltage VOUT is fed to a single-input hysteretic comparator 202 from a switching regulator LC filter, such as filter 104. A change in output voltage VOUT due to a sudden change in load current $I_{OUT}$ that exceeds the hysteretic limits of comparator 202 causes comparator 202 to respond instantaneously with a large duty cycle adjustment, if needed. This allows output voltage VOUT to be corrected very quickly and is ideally suited for digital type loads.

Figure 2B:
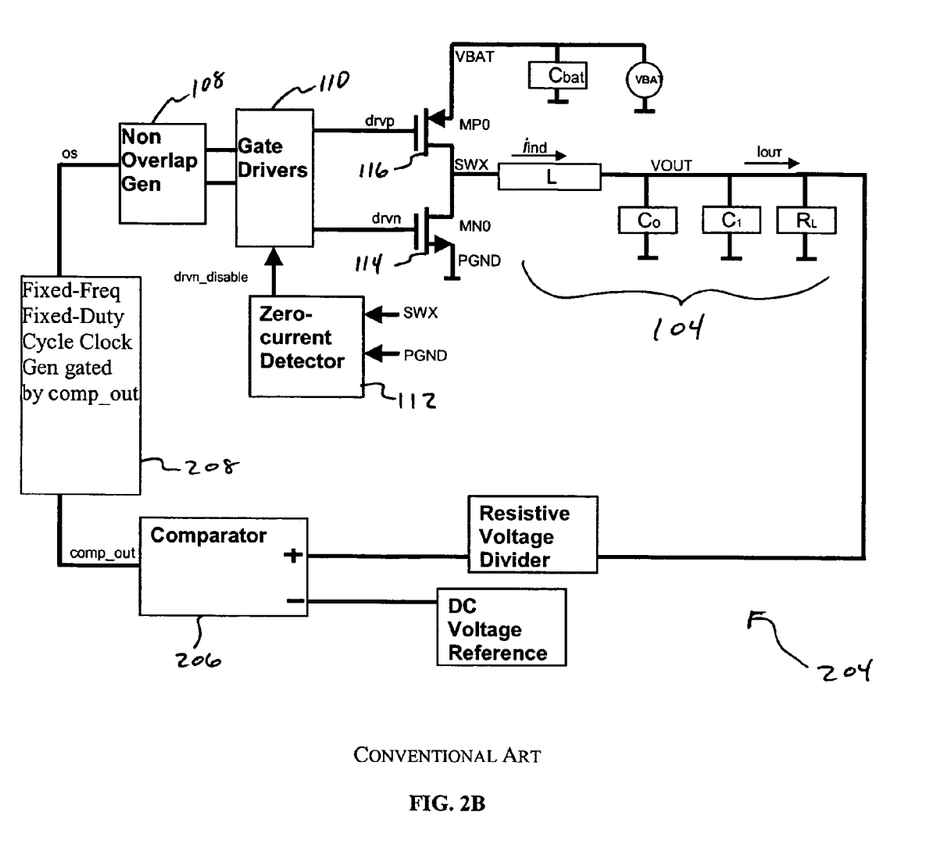
FIG. 2B illustrates a conventional burst mode (gated-oscillator) switcher.

FIG. 2B illustrates a conventional burst mode switcher 204. The burst mode regulation loop involves a hysteretic comparator 206, a fixed-frequency fixed duty-cycle clock generator 208 with enable control, non-overlap generator 108, gate drivers 110, zero-current detector 112, power switches 116 and 114, and LC filter 104. Unlike hysteretic switcher 200, where the output of hysteretic comparator 202 is fed directly into non-overlap generator 108, conventional burst mode switcher 204 has hysteretic comparator 206 controlling fixed-frequency fixed duty-cycle clock generator 208. Conventional burst mode switcher 204 is efficient only for light loads where it is able to operate with short bursts of the fixed-frequency fixed duty-cycle clock pulses at a lower rate.

Hysteretic type switchers, such as hysteretic switcher 200, operate according to a self-oscillating frequency that relies on the hysteresis window to maintain overall loop stability. Although hysteretic switchers can respond much faster than the PWM type, their switching frequency may vary depending on external component LC values and input/output voltages. This poses a problem, especially when there are sensitive analog and radio frequency circuitry on the same die as the switcher, because hysteretic switchers can switch at frequencies that can interfere with the operation of the analog and RF circuits.

Frequency compensation can occur without dependence on external passive parameters or complex networks with floating capacitors. Further, an automatic mode change can be provided in a PWM and burst type switching regulator according to embodiments of the present invention.

Figure 4:
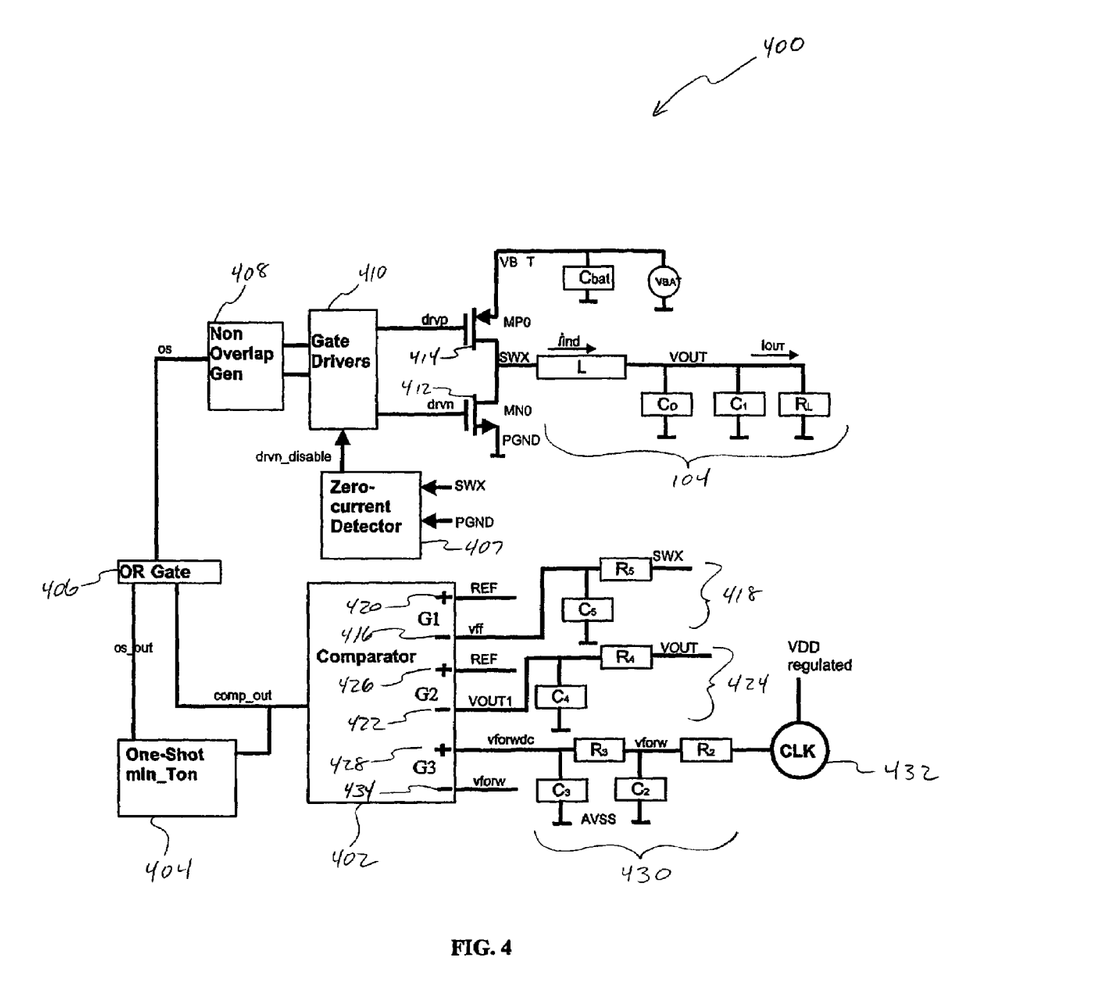
FIG. 4 illustrates an exemplary PWM type switcher for use in a switching regulator.

FIG. 4 illustrates an exemplary PWM type switcher 400 of a switching regulator according to embodiments of the present invention. PWM switcher 400 includes a multi-input comparator 402, a one-shot generator 404, an OR gate 406, a zero-current detector 407, a non-overlap generator 408, gate drivers 410, NMOS switch 412, and PMOS switch 414. Comparator 402 outputs comparator output signal comp_out. Comparator 402 has different input gains G1, G2, and G3 for each differential input.

A first input 416 to comparator 402 is coupled to a low pass RC network 418. RC network 418 includes a resistance $R_5$ and a capacitance $C_5$. A feedforward signal SWX from switches 412 and 414 is input to RC network 418. RC network 418 outputs signal vff, which is input to first input 416. The complement 422 of first input 418 is connected to a reference voltage REF. First input 416 and complement 420 form a first differential input to comparator 402.

A second input 422 to comparator 402 is coupled to a low pass RC network 424. RC network 424 includes a resistance $R_4$ and a capacitance $C_4$. A feedback signal VOUT from a PWM switching regulator LC filter, such as filter 104, is input to RC network 424. RC network 424 outputs signal VOUT1, which is input to second input 422. The complement 426 of second input 422 is connected to a reference voltage REF. Second input 422 and complement 426 form a second differential input to comparator 402.

A third input 428 to comparator 402 is coupled to an RC network 430. RC network 430 includes resistances $R_2$ and $R_3$ and capacitances $C_2$ and $C_3$. A clock voltage source 432 generates a fixed frequency reference ramp voltage, which is input to RC network 430. A first output vforwdc of RC network 430 is then input to third input 428. The complement 434 of third input 428 is connected to a second output vforw of RC network 430. Third input 428 and complement 434 form a third differential input to comparator 402.

PWM switcher 400 operates in PWM mode for high load currents and automatically changes to burst mode under low load current conditions. PWM switcher 400 switches at constant frequency when in moderate-to-heavy loading condition (e.g., Continuous Current Mode or "CCM"). Due to the absence of an integrator in PWM switcher 400, the loop gain is not high. Hence, as will be described with reference to FIG. 6, below, there is an inherent DC offset that causes the finite-amplitude ramp to rise or fall below the comparator zero-crossing threshold depending on a load current $I_{OUT}$. When load current $I_{OUT}$ decreases such that it goes into discontinuous current mode ("DCM"), PWM switcher 400 changes to a burst-like switching condition. In this burst-like switching condition, bursts of switching pulses are followed by periods of non-switching. Hence, the overall switching frequency is reduced automatically to ensure good efficiency. The average switching frequency is the frequency of occurrence of such bursts of inductor current peaks. This behavior at low load currents is provided without invoking a mode-change or architecture-change to realize the burst-mode behavior.

Since PWM switcher 400 does not have an integrator in the signal path, output signal VOUT instead passes through RC filter 424. This provides some amount of high frequency filtering before connecting to input 426 of comparator 402. Since the ramp voltage produced by clock 432 is made to be small relative to output voltage VOUT, a change in output voltage VOUT causes instantaneous and relatively large changes in duty cycle in order to correct the change. This significantly speeds up the transient response time of PWM switcher 400. The path of signal SWX through RC filter 418 provides a first order feedforward path to input 416 of comparator 402. This allows two zeroes to be created to enhance the phase margin without the use of additional active circuitry and floating capacitors, as expressed in the loop transfer function Equation 1 below:

$$A_{open-loop} = \frac{\frac{VBAT \times (G_1 + G_2)}{G_3 \times (vforwdc - vforw)} \times \left[ 1 + \frac{1}{(G_1 + G_2)} \times \left\{ G_1 \times \frac{L}{R_L} + G_2 R_5 \times C_5 \right\} \times s + \frac{G_1}{(G_1 + G_2)} \times L \times C_L \times s^2 \right]}{(1 + R_5 \times C_5 \times s) \times \left( 1 + \frac{L}{R_L} \times s + L \times C_L \times s^2 \right)}$$ (Eq. 1)

Zero-current detector 407 depicted in FIG. 4 is used to detect any reverse current flow from output voltage VOUT into ground signal PGND when load current $I_{OUT}$ is low enough, causing inductor current $I_{IND}$ to enter the DCM loading condition. When the DCM loading condition occurs, zero-current detector 407 disables NMOS switch 412 so as to protect efficiency.

In PWM switcher 400, comparator 402 receives the three differential inputs, which are compared as shown in Equation 2 below:

comp_out=$A_C${G1(REF−vff)+G2(REF−VOUT1)+G3 (vforwdc-vforw)} (Eq. 2)

where $A_C$ is the open-loop gain of comparator 402 and G1, G2, and G3 are the comparator gains for the respective paths.

Figure 6:
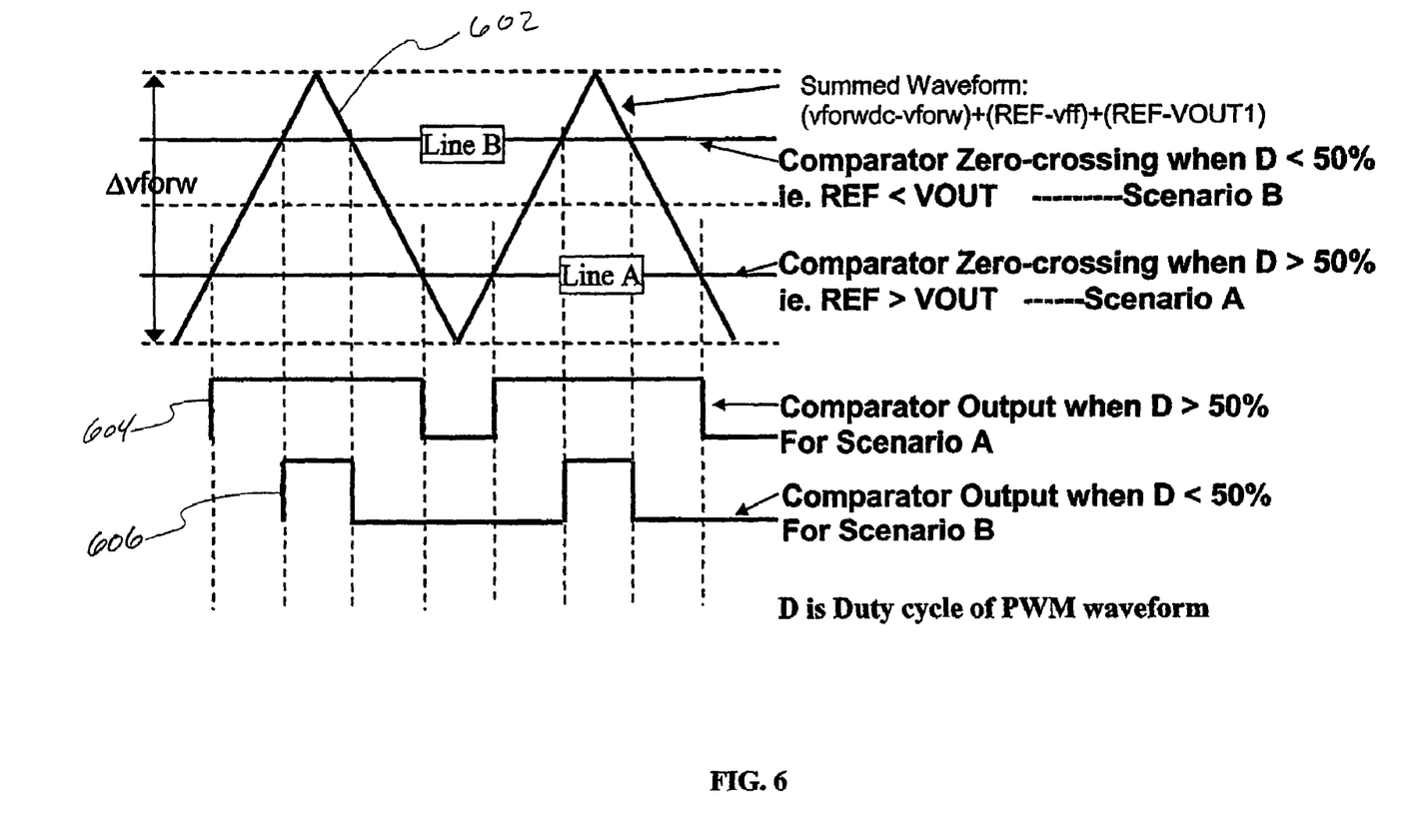
FIG. 6 illustrates input and output waveforms for an exemplary comparator used in the PWM type switcher depicted in FIG. 4.

FIG. 6 illustrates the summation of the three differential signals seen in Equation 2 with zero-crossing thresholds of comparator 402 shown for two duty cycle scenarios. The summation of the three differential signals (i.e., (REF−vff)+(REF−VOUT1)+(vforwdc−vforw)) appears as a triangular waveform 602 with an offset voltage. The offset voltage is proportional to the summation of the terms (REF−vff) and (REF−VOUT1), and serves as the combined feedback signal of the dual loops in PWM switch 400. Signal VOUT1 is a first-order low pass filtered version of output voltage VOUT, while signal vff is a first-order low pass filtered version of signal SWX. The average value of output voltage VOUT (and, consequently, signal VOUT1) differs from the average value of signal vff by the voltage drop across an inductor L and any parasitic resistances in the path. The amplitude of the triangular waveform (i.e., Δvforw) is proportional to the differential voltage (vforwdc−vforw).

When the load current (e.g., $I_{OUT}$ in FIG. 4) increases, it causes a decay in output voltage VOUT. This leads to an increase in the voltage differential (REF−VOUT1). The value of voltage differential (REF−vff) suffers a decrease in voltage since signal vff tracks output voltage VOUT. The net effect is an increased offset voltage, as mentioned above, that lifts summed triangular waveform 602 higher with respect to the zero-crossing threshold of comparator 402, as shown by line A in FIG. 6. The intersections between summed triangular waveform 602 and the zero-crossing threshold of comparator 402 give rise to the transition edges of the resultant PWM waveforms at the output of comparator 402. Higher load current results in a duty cycle greater than 50%, as shown by resultant waveform 604 for comparator output signal comp_out, corresponding to line A. The higher duty cycle in waveform 604 for comparator output signal comp_out allows PMOS switch 434 in FIG. 4 to turn on for a longer time, so as to replenish any charge lost in output capacitors $C_0$ and $C_2$ due to the larger $I_{OUT}$ drain.

When load current $I_{OUT}$ decreases, it causes an increase in output voltage VOUT. This leads to a decrease in the voltage differential (REF−VOUT1), while the voltage differential (REF−vff) increases. The net effect is a lower offset voltage that brings down summed triangular waveform 602 against the zero-crossing threshold of comparator 402 as shown by line B in FIG. 6. The intersection points are now along line B. The resultant PWM waveform 606 for comparator output signal comp_out illustrates the comparator output for line B, where the duty cycle is less than 50%. This means that PMOS switch 414 is being turned on less than 50% of the time because the charge loss at output capacitors $C_0$ and $C_1$ is not excessive due to a lower load current.

As load current $I_{OUT}$ slowly decreases, summed waveform 602 also lowers itself against the zero-crossing threshold of comparator 402 in response to the load change. When load current $I_{OUT}$ is low enough, summed waveform 602 no longer intersects at all with the zero-crossing threshold of comparator 402 (line B). When this happens, the switching frequency of PWM switch 400 decreases and there are no PWM pulses in comparator output signal comp_out. Hence, PMOS switch 414 will not turn on. This creates a period of non-switching in time. During this period of non-switching, the load continues to draw current out of output capacitors $C_0$ and $C_1$, causing a slow decay of output signal VOUT. When output signal VOUT drops to a level where summed waveform 602 intersects the zero-crossing threshold of comparator 402 again, PMOS switch 414 (and thus PWM switcher 400) starts to switch again. Hence, the operation repeats itself in regulating output voltage VOUT during a low current load scenario.

Figure 7:
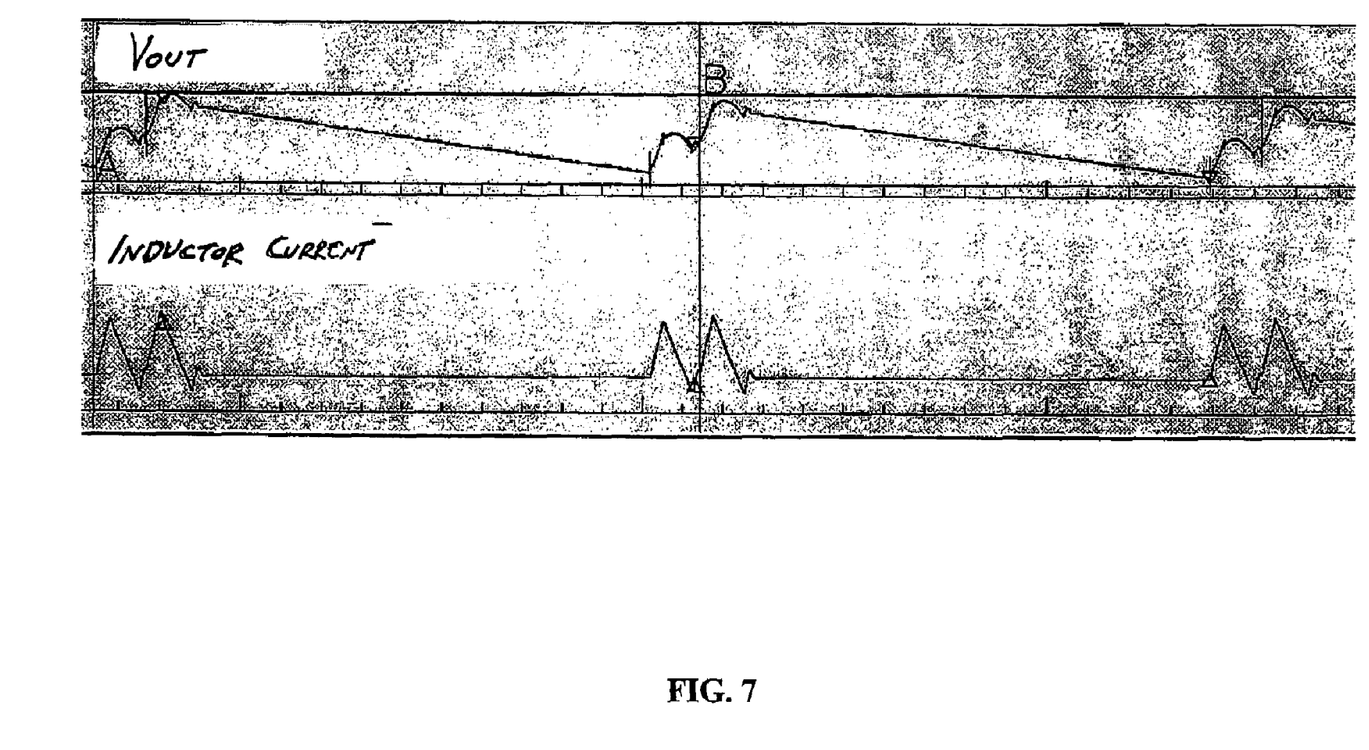
FIG. 7 illustrates an exemplary output voltage waveform and an exemplary inductor current waveform of the PWM type switcher depicted in FIG. 4 under low load conditions.

This burst-like behavior resembles the burst mode (gated oscillator) operation in a conventional switcher. FIG. 7 is a graph illustrating the inductor current $I_{IND}$ and output voltage VOUT under a low-load condition for PWM switcher 400. Inductor current IND exhibits burst-like behavior in this condition. In FIG. 7, the waveform for output voltage VOUT appears as a ripple voltage about a steady-state value which is proportional to reference signal REF. The waveform for inductor current $I_{IND}$ appears as a train of pulses separated by periods of non-switching. When PWM switcher 400 is not switching, output voltage VOUT undergoes a voltage decay whose slope is equal to $(I_{OUT})/(C_O+C_1)$.

Returning to FIG. 6, when summed waveform 602 no longer intersects the zero-crossing threshold of comparator 402, it implies that the voltage differential (vforwdc−vforw)

is no longer involved in the loop regulation. The only two active components at this time are voltage differential (REF−vff) and voltage differential (REF−VOUT1).

The onset of the burst-like behavior in PWM switch 400 can also be made to occur at a larger current load when summed waveform 602 is still intersecting with the zero-crossing threshold of comparator 402. Referring to FIG. 4, this is achieved through the setting of a minimum on-time signal min_Ton of one-shot generator 404. As the load decreases, the duty cycle of the PWM waveform for comparator output signal comp_out also decreases. When the on-pulse of comparator output signal comp_out is shorter in duration compared to minimum on-time signal min_Ton of one-shot generator 404, the on-pulse of comparator output signal comp_out is replaced by the longer pulse of minimum on-time signal min_Ton at OR gate 406 to give a final output signal os. Final output signal os is input to non-overlap generator 408 and gate drivers 410 to drive PMOS switch 414 and NMOS switch 412.

Hence, application of one-shot generator 404 is similar to the scenario when summed waveform 602 (FIG. 6) does not intersect the zero-crossing threshold of comparator 402. PWM switcher 400 is able to achieve a graceful and automatic change in the switcher mode from PWM mode to burst mode without invoking an architecture change and the burst-like behavior is similar to a conventional burst mode switcher.

Figure 5:
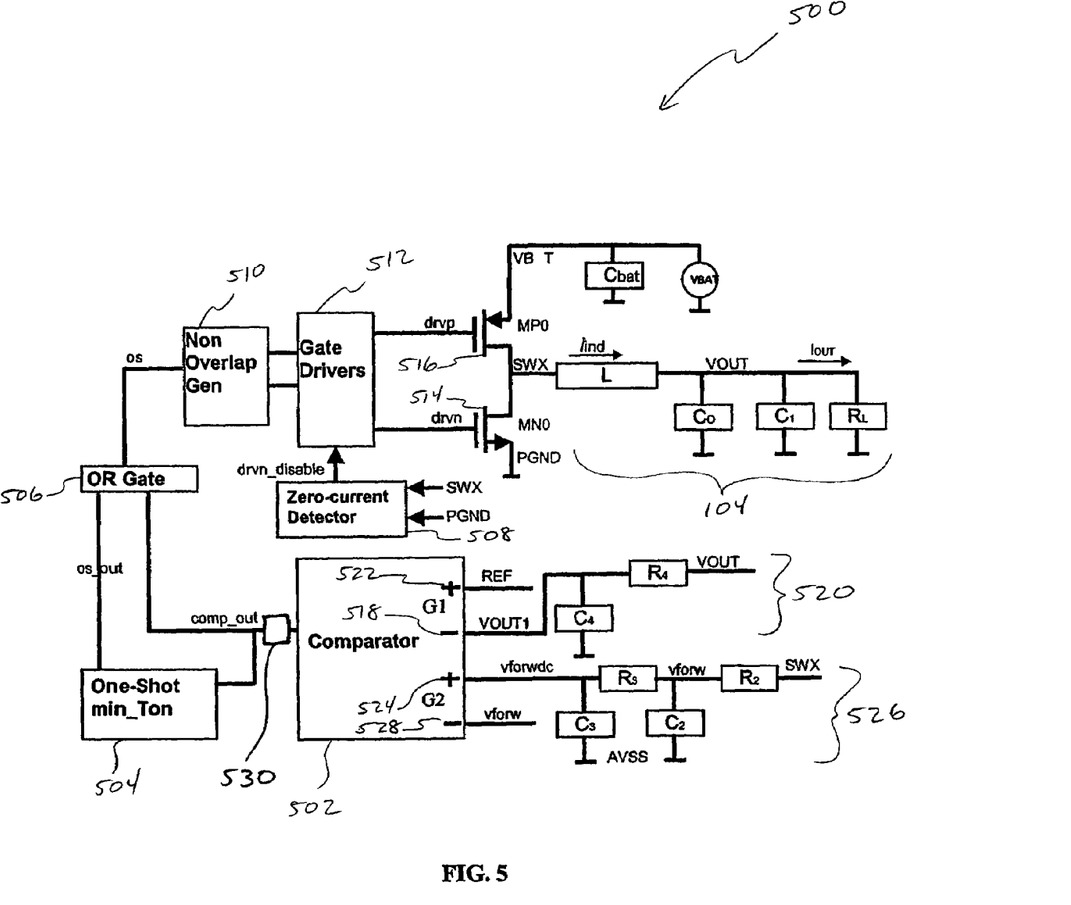
FIG. 5 illustrates an exemplary LPOM type switcher for use in a switching regulator.

FIG. 5 illustrates an exemplary LPOM switcher 500 of a switching regulator according to embodiments of the present invention. LPOM switcher 500 includes a multi-input comparator 502, a delay block 530, a one-shot generator 504, an OR gate 506, a zero-current detector 508, a non-overlap generator 510, gate drivers 512, NMOS switch 514, and PMOS switch 516. Comparator 502 outputs comparator output signal comp_out. Comparator 502 has different input gains G1 and G2 for each differential input. A first input 518 to comparator 502 is coupled to a low pass RC network 520. RC network 520 includes a resistance $R_4$ and a capacitance $C_4$. A feedback signal VOUT from a LPOM switching regulator LC filter, such as filter 104, is input to RC network 520. RC network 520 outputs signal VOUT1, which is input to first input 518. The complement 522 of first input 518 is connected to a reference voltage REF. First input 518 and complement 522 form a first differential input to comparator 502.

A second input 524 to comparator 502 is coupled to an RC network 526. RC network 526 includes resistances $R_2$ and $R_3$ and capacitances $C_2$ and $C_3$. A feedforward signal SWX from switches 514 and 516 is input to RC network 526. A first output vforwdc of RC network 526 is then input to second input 524. The complement 528 of second input 524 is connected to a second output vforw of RC network 526. Second input 524 and complement 528 form a second differential input to comparator 502.

LPOM switcher 500 operates in self-oscillating mode in all load current conditions. The only difference lies in the hysteresis of comparator 502, in that the hysteresis of comparator 502 is the intrinsic hysteresis inherent in comparator 502. This is different from comparator 202 in a conventional hysteretic-type switch, in which the comparator hysteresis is dominated by a deliberate hysteresis-generating function in comparator 202.

The advantage of LPOM switcher 500 over conventional hysteretic switcher 200 is that the switching frequency can be made to be less independent of external component variations. Zero current detector 508 enables LPOM switch 500 to operate at a lower switching frequency for low load currents, as it turns off NMOS transistor 514 when a current polarity reversal is detected.

LPOM switcher 500 acts similarly to an RC relaxation oscillator whereby a voltage differential (vforwdc−vforw) is derived through a cascaded RC network (e.g., RC network 526) that is connected to signal SWX, as shown in FIG. 5.

In LPOM switcher 500, comparator 502 receives the two differential inputs, which are compared as shown in Equation 3 below:

$$\text{comp\_out} = A_C \{G1(\text{REF} - \text{VOUT1}) + G2(\text{vforwdc} - \text{vforw})\} \quad \text{(Eq. 3)}$$

where $A_C$ is the open-loop gain of comparator 502 and G1 and G2 are the comparator gains for the respective signal paths.

LPOM switcher 500 is self-oscillating, with a switching frequency fsw_hys given by Equation 4 below:

$$\text{fsw\_hys} = \frac{1}{\frac{(VBAT)(R_2)(C_2)(V_{hys})}{VOUT(VBAT - VOUT)} + \frac{(td)(VBAT^2)}{VOUT(VBAT - VOUT)}} \quad \text{(Eq. 4)}$$

where VBAT is the battery supply voltage, $V_{hys}$ is an inherent hysteresis function in comparator 502, and td is the loop delay inclusive of a delay block 530 at the output of comparator 502. In this super-low-power mode, comparator 502 is biased with lower current, which causes the delay td to dominate the switching frequency of LPOM switcher 500.

Figure 8:
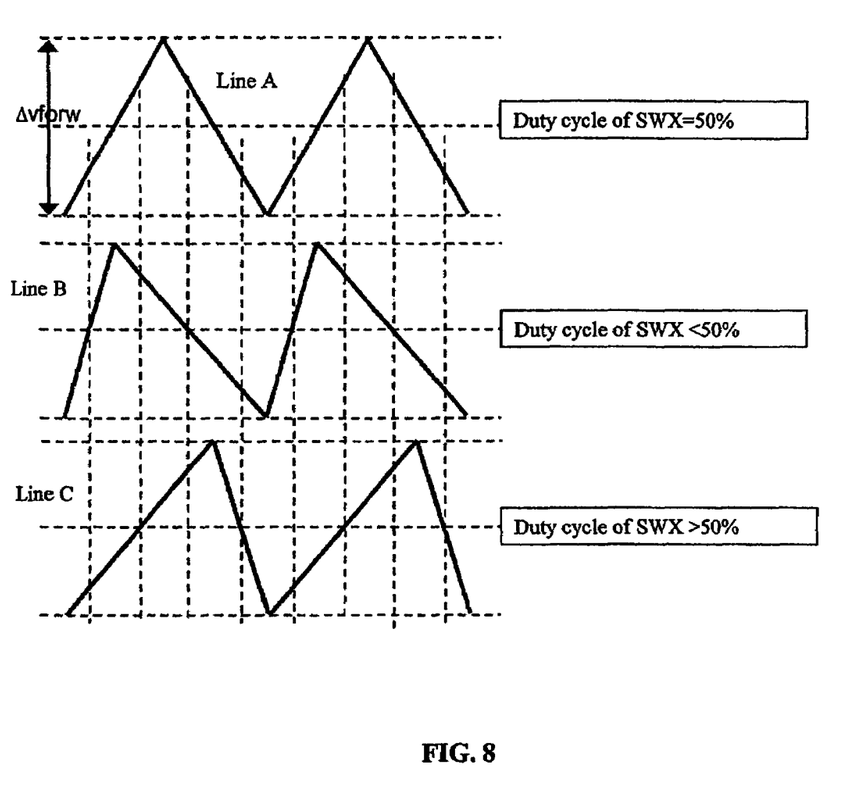
FIG. 8 illustrates input waveforms to an exemplary comparator used in the LPOM type switcher depicted in FIG. 5.

FIG. 8 illustrates the triangular waveform created by voltage differential (vforwdc−vforw). The shape of the triangular waveform is proportional to the duty cycle of the voltage waveform of signal SWX. Line A of FIG. 8 illustrates the waveform when the duty cycle of signal SWX is exactly 50%, meaning that PMOS switch 516 is being turned on 50% of the time. Line B of FIG. 8 illustrates the waveform when the duty cycle of signal SWX is less than 50%, meaning that PMOS switch 516 is being turned on less than 50% of the time because the charge loss at the capacitors is not excessive due to a lower load current. Line C of FIG. 8 illustrates the waveform when the duty cycle of signal SWX is greater than 50%, meaning that PMOS switch 516 is being turned on more than 50% of the time so as to replenish the charge lost in output capacitors $C_0$ and $C_1$.

Returning to FIG. 5 and Equation 4, switching frequency fsw_hys is normally sensitive to external component variations such as the ESR of output capacitors $C_0$ and $C_1$. In LPOM switcher 500, gains G1 and G2 can be adjusted such that LPOM switcher 500 can be made less sensitive to such component variations. This results in a more stable switching frequency during CCM. However, when LPOM switcher 500 is made less sensitive to external component variations in output voltage VOUT, LPOM switcher 500 is also less sensitive to sudden changes in load current $I_{OUT}$. Hence, adjustments to gains G1 and G2 may be made, balancing between the sensitivity to external component variations and the sensitivity to sudden changes in load current $I_{OUT}$. Generally, gains G1 and G2 are set so that switching frequency fsw_hys remains stable, since LPOM switcher 500 is inherently fast enough.

PWM switcher 400 is thus advantageous over the conventional PWM type switcher of FIG. 1 for several reasons. PWM switcher 400 uses a 6-input terminal comparator (comparator 402) to generate the appropriate duty cycle for the power switches. The input pair for gain G1 (inputs 416 and 420) receives low pass filtered signal SWX. As a result of the regulator switching action, the low pass filtered voltage of signal SWX takes the shape of a saw-tooth waveform that is similar to the waveform of inductor current $I_{IND}$; therefore, it is suitable for use as a ramp source for comparator 402. Since no error amplification is required (as is the case with conventional PWM switcher 100), no delay is caused due to loop response time. Thus, a faster input line step response and load step response can be expected. The input pair for gain G2 (inputs 422 and 426) receives the regulated voltage output and the reference voltage. The input pair for gain G2 thus uses the AC ripple at LC filter 104 to correct output voltage. The input pair for gain G3 (inputs 428 and 434) comes from a fixed frequency ramp signal. This ramp signal is generated off RC network 430. All six inputs are fed as inputs to comparator 402 to generate on/off pulses for the power switches. Since the fixed frequency ramp is dominant, comparator 402 is able to generate the correct duty ratio at fixed frequency for the power switches under the CCM condition.

Similarly, LPOM switcher 500 is advantageous over the conventional hysteretic type switcher of FIG. 2 for several reasons. LPOM switcher 500 uses a 4-input terminal comparator (e.g., comparator 502) to generate the appropriate duty cycle for the power switches. Since hysteretic switchers are self-oscillating, their switching frequency is highly sensitive to component variations. LPOM switcher 500 is able to make its switching frequency more stable by deploying second inputs (inputs 524 and 528) to complement the first inputs (inputs 518 and 522).

Neither of PWM switcher 400 or LPOM switcher 500 uses an integrator, thereby providing a better transient response. Instead, the comparators for switchers 400 and 500 each have a programmable gain for the feedback loop. Additionally, switchers 400 and 500 provide automatic reduction in switching frequency during low current loading condition. Specifically, a minimum one-shot that turns on PMOS switches 414 or 516 during low loading, coupled with the use of zero current detectors 407 and 508, respectively, allows the frequency to be reduced for high efficiency performance over a variety of loading conditions. Compensation is achieved by the use of simple RC networks, which obviates the need for active compensation.

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A pulse width modulation switcher comprising:
   a pair of switches to provide a switch output signal;
   a multi-input comparator coupled in a feedback loop to the pair of switches, the comparator having a first differential input for receiving a first differential signal, a second differential input for receiving a second differential signal, and a third differential input for receiving a third differential signal, each differential input having its own gain;
   a first RC network coupled to the first differential input for receiving a filtered version of the switch output signal;
   a second RC network coupled to the second differential input for receiving the switch output signal;
   a third RC network coupled to the third differential input for receiving a ramp voltage; and
   a second comparator coupled to the output of the switches and having the ground voltage as a reference signal,
   wherein an output signal of the multi-input comparator determines a duty cycle for turning on the pair of switches.

2. The switcher of claim 1, wherein the switching frequency is automatically reduced when the second comparator detects a sufficient amount of inductor current reversal.

3. The switcher of claim 1, wherein the multi-input comparator combines the first, second, and third differential signals and compares the combination to a zero-crossing threshold of the comparator.

4. The switcher of claim 3, wherein the first, second, and third differential signals are combined according to the algorithm:

$$\text{comp\_out}=A_C\{G1(REF-vff)+G2(REF-VOUT1)+G3(vforwdc-vforw)\},$$

wherein $A_C$ is an open-loop gain of the comparator, G1 is the gain of the first differential input, G2 is the gain of the second differential input, G3 is the gain of the third differential input, (REF−vff) is the first differential signal, (REF−VOUT) is the second differential signal, and (vforwdc−vforw) is the third differential signal.

5. The switcher of claim 1, further comprising a one-shot generator to generate a minimum on-time signal that replaces the output signal of the comparator when an on-pulse of the minimum on-time signal is longer than an on-pulse of the output signal of the comparator.

6. The switcher of claim 1, wherein the ramp voltage is a fixed frequency reference ramp voltage.

7. A low-power operating mode switching regulator, comprising:
   a pair of switches to provide a current to a load, wherein the pair of switches comprises a PMOS switch and an NMOS switch;
   a multi-differential input comparator coupled to a plurality of filtered outputs of the pair of switches in a feedback loop, the multi-differential input comparator comprising (1) a first differential input to receive a first filtered output of the pair of switches and (2) a second differential input to receive a second filtered output of the pair of switches;
   a second comparator coupled to the output of the pair of switches; and
   a delay between the multi-input comparator and the pair of switches,
   wherein the delay determines a switching frequency of the pair of switches,
   wherein the multi-differential input comparator sums the first filtered output of the pair of switches and the second filtered output of the pair of switches, and compares the summation to a threshold of the comparator to generate an output signal of the comparator, and
   wherein the first and second differential signals are combined according to the algorithm:

$$\text{comp\_out}=A_C\{G1(REF-VOUT1)+G2(vforwdc-vforw)\}$$

wherein $A_C$ is an open-loop gain of the multi-input comparator, G1 is the gain of the first differential input, G2 is the gain of the second differential input, (REF−VOUT1) is the first differential signal, and (vforwdc−vforw) is the second differential signal.

8. The switching regulator of claim 7, wherein the delay causes a delay in the output signal of the comparator.

9. The switching regulator of claim 7, further comprising a one-shot generator to generate a minimum on-time signal that replaces an output signal of the delay when an on-pulse of the minimum on-time signal is longer than an on-pulse of the output signal of the delay.

* * * * *

UNITED STATES PATENT AND TRADEMARK OFFICE
CERTIFICATE OF CORRECTION

PATENT NO. : 7,446,519 B2  Page 1 of 1
APPLICATION NO. : 11/494634
DATED : November 4, 2008
INVENTOR(S) : Low et al.

It is certified that error appears in the above-identified patent and that said Letters Patent is hereby corrected as shown below:

Cover Page, Item (75), Inventors, please replace "Hsin-Chi (TW)" with --Hsin-Chi City (TW)--.

Signed and Sealed this

Third Day of March, 2009

JOHN DOLL
*Acting Director of the United States Patent and Trademark Office*